US012183189B2

(12) United States Patent
Eilertsen

(10) Patent No.: US 12,183,189 B2
(45) Date of Patent: Dec. 31, 2024

(54) DISTRIBUTED TRAFFIC GUIDANCE AND SURVEILLANCE SYSTEM

(71) Applicant: Roger Andre Eilertsen, Askim (NO)

(72) Inventor: Roger Andre Eilertsen, Askim (NO)

( * ) Notice: Subject to any disclaimer, the term of this patent is extended or adjusted under 35 U.S.C. 154(b) by 443 days.

(21) Appl. No.: 17/240,151

(22) Filed: Apr. 26, 2021

(65) Prior Publication Data

US 2021/0248903 A1 Aug. 12, 2021

Related U.S. Application Data

(63) Continuation-in-part of application No. 16/333,951, filed as application No. PCT/NO2017/000023 on Sep. 15, 2017, now abandoned.

(30) Foreign Application Priority Data

Sep. 16, 2016 (NO) .................................... 20161473

(51) Int. Cl.
*G08G 1/01* (2006.01)
*G08G 1/056* (2006.01)

(52) U.S. Cl.
CPC ......... *G08G 1/0112* (2013.01); *G08G 1/0133* (2013.01); *G08G 1/0141* (2013.01); *G08G 1/0145* (2013.01); *G08G 1/056* (2013.01)

(58) Field of Classification Search
CPC ............. G01C 21/3492; G08G 1/0112; G08G 1/0133; G08G 1/0145; H04W 4/024; H04W 4/02; H04W 4/029; H04W 4/46
See application file for complete search history.

(56) References Cited

U.S. PATENT DOCUMENTS

| | | | | |
|---|---|---|---|---|
| 9,086,295 | B2 | 7/2015 | Nortrup | |
| 9,805,601 | B1 * | 10/2017 | Fields | G08G 1/0129 |
| 2004/0230370 | A1 | 11/2004 | Tzamaloukas | |
| 2010/0312466 | A1 | 12/2010 | Katzer et al. | |
| 2011/0313654 | A1 | 12/2011 | Olson et al. | |
| 2013/0041574 | A1 * | 2/2013 | Koshizen | G08G 1/0133 701/118 |
| 2013/0282264 | A1 | 10/2013 | Bastiaensen et al. | |
| 2014/0309927 | A1 | 10/2014 | Ricci | |
| 2014/0350830 | A1 | 11/2014 | David | |
| 2016/0061625 | A1 | 3/2016 | Wang | |
| 2017/0115126 | A1 | 4/2017 | McMaster et al. | |
| 2017/0146353 | A1 | 5/2017 | Kroeller et al. | |
| 2017/0184409 | A1 | 6/2017 | Glasgow et al. | |

FOREIGN PATENT DOCUMENTS

| | | |
|---|---|---|
| GB | 2462910 | 3/2010 |
| WO | WO 2007/089087 | 8/2007 |

OTHER PUBLICATIONS

International Search Report for PCT/No. 2017/000023 dated Dec. 13, 2017.

* cited by examiner

*Primary Examiner* — Jaime Figueroa
*Assistant Examiner* — Zachary Joseph Wallace
(74) *Attorney, Agent, or Firm* — Morse, Barnes-Brown & Pendleton, P.C.; Sean D. Detweiler, Esq.

(57) ABSTRACT

The present invention comprises at least one server system in communication with client systems either installed in computer systems of respective cars or installed in smart phones with GPS transceivers carried by drivers of respective cars, wherein the at least one server system is configured to detect possible traffic congestions by early detection of consistent changes in car distances.

16 Claims, 3 Drawing Sheets

DISTRIBUTED TRAFFIC GUIDANCE AND SURVEILLANCE SYSTEM

RELATED APPLICATIONS

This application is continuation-in-part of U.S. application Ser. No. 16/333,951, filed Mar. 15, 2019, which is a national stage filing under 35 U.S.C. 371 of International Application No. PCT/NO2017/000023, filed Sep. 15, 2017, which claims priority to Norway Application No. 20161473, filed Sep. 16, 2016. The entire teachings of said applications are incorporated by reference herein.

FIELD OF THE INVENTION

The present invention is related to a distributed road traffic guidance and surveillance system comprising at least one server associated with a road system of a geographical area wherein the at least one server is configured to detect a probable traffic congestion on the road system of the geographical area.

BACKGROUND

Modern cars are today more or less advanced computer systems on wheel with Internet access. Despite the "modernity" of new cars, one problem remains despite advanced new technologies for cars and traffic control and that is the number of cars on the roads.

Cities have evolved with an infrastructure with constraints inherited from city developments from as far back in time as the antique. Modern city planning and modernization has improved the situation. However, the main traffic problem due to a huge number of cars on the roads is of course congestions of cars on respective roads that may block traffic for hours.

Traffic flow problems are an area of interest in many mathematical disciplines like queueing theory and flow theory.

However, mathematical traffic flow theory has not yet produced any lasting solutions to the traffic congestion problems of cities. The main problem is that the mathematical analysis usually provides forecasts, which has variable reliability and duration. Further, traffic is subject to random incidents like road traffic accidents, which one cannot foresee.

Some aspects of the theoretical works have produced some meaning full principles regarding guiding traffic.

For example, it is common to look at game theory and one important concept is the concept of Nash equilibrium. A simple way of explaining the concept of the Nash equilibrium related to traffic is by a simple example of two road users. Road user A and road user B are in Nash equilibrium if road user A is making the best decision for a travel route by taking into account road user B's decision for his travel route, and road user B is making the best decision he can by taking into account road user A's decision. Likewise, a group of road users are in Nash equilibrium if each one is making the best decision about the traffic that he or she can do by taking into account the decisions of the others in the traffic.

Another interesting aspect of road condition is how road capacity influences traffic flow. A German mathematician Dietrich Braess found what is denoted as the Braess paradox. The paradox states that adding extra capacity to a network when moving entities selfishly choose their own routes in the network may reduce overall performance. This is because the Nash equilibrium of such a system is not necessarily optimal. Selfish behaviour does not favour cooperation between road users in the traffic.

For example, in Seoul in South Korea an increase in traffic flow capacity around the city happened when the city removed an existing motorway segment. In Stuttgart in Germany, in 1969, a new road network did not provide the expected improvement in travel time before closing a new section of the road for traffic. The same phenomena occurred in New York City in 1990 when traffic on the 42$^{nd}$ street was blocked. This reduced the traffic congestion in the area.

Frank Knight did some of the first attempts to produce a mathematical theory with respect to traffic flow in the 1920s. The attempts provided a theory of traffic equilibrium, which was refined into Wardrop's first and second principles of equilibrium in 1952.

Even with the significant computer processing power that exists today there have been no substantial results from systems applied to real traffic flow conditions. Current traffic models use a mixture of empirical and theoretical techniques. These models then make traffic forecasts and the forecasts try to identify areas of congestion where the current traffic on roads needs rerouting for example.

Beside the theoretical approach to traffic flow theory, most cars are today equipped with navigation systems, or users may have downloaded navigation apps to their smart phones. The Global Positioning System (GPS) makes it possible for navigation terminals to identify geographical positions of GPS transceivers located inside the navigation terminals, smart phones etc. and the changing and recorded positions of the GPS transceivers may be plotted on computer implemented maps residing in the navigation terminal or mobile phone. Then, road users may for example view the moving position on roads in the computer implemented map being displayed on a terminal display they can view.

Another example of use of GPS transceivers is letting a centralized computer system collect GPS positions from a plurality of cars and use the number of cars as basis for indicating traffic flow conditions. For example, Google Maps indicate traffic flow conditions with different colours. Green is for open roads, yellow is for roads with high traffic density, while red coloured roads experience congestions or are blocked.

Traditionally, navigation terminals may propose alternative routes when there is a traffic congestion. However, it is known that navigation terminals use the same algorithm (Dijkstra's algorithm) and will propose the same alternative roads to every road user using the system in an area with traffic congestion, and the problem is shifted to other roads. Therefore, a further aspect of the present invention is that individual guiding of road users might mitigate traffic problems induced by collective guidance of road users from traffic guidance systems.

Traditionally, use of sensors deployed around roads has been done to try to measure respective traffic problems. However, sensor technology as such has a limited use. It is also a question related to how to use sensor measurements.

A further development of sensors trying to mitigate measurement problems is the concept of distributing intelligent agents around roads and/or among road users etc. Traffic and transportation systems is well suited for an agent-based approach because of the geographical distribution, and due to some aspects of the behaviour of the traffic. There exists an international standard for intelligent agents supported by the Foundation for Intelligent Physical Agents (FIPA). When managing traffic problems, the most appealing characteristics of agents are their possible ability to react quickly to traffic incidents. In a multi-agent system (MAS), agents communicate with other agents in a system being adapted to be a distributed problem-solving system.

Further information about FIPA and intelligent agents is disclosed on //www.fipa.org/.

An aspect of the collective feature of traffic is that when normal traffic conditions are present, road users tend to be driving with some distance between them primarily out of security reasons. If a car in front of another car starts to brake, the road users behind need a few seconds to react, and during the reaction time period, the speed of the car behind is greater than the speed of the braking car in front. Thereby the distance between the cars decreases. If the breaking situation is the start or trigger of a congestion, further cars behind will catch up with cars in front of them. Interestingly, like a paradox, the reaction time is accumulating cars closer to each other in the queue freeing road capacity behind the cars slowing down. The paradox is then that when cars slow down or even stop moving due to the accumulation, then more cars can be accumulated on the road behind the start of the traffic congestion until the road segment is full of cars, which increases the problem with traffic congestions.

A simple example illustrates the situation. If there are 2000 cars on a road segment and the average distance between the cars is three meters when driving on the road under normal condition, an upcoming congestion would probably reduce the average distance between cars to one meter.

Theoretically, the accumulation of cars will then result in 4000 meters of road capacity that may start to be filled with new arrivals of further cars. When the congestion begins to dissolve a reaction time of road users of one second would create a delay of 2000 seconds among the first car to start to drive normally again compared to the last of the original 2000 cars. This is a simplified description but illustrates some aspects of collective features of traffic in general.

Japanese patent application JP-2009-286274 discloses an apparatus located in a host vehicle wherein other vehicles are detected by a millimetre wave radar device. The vehicle density between the other vehicles present within a predetermined distance from the host vehicle is calculated. Based on the speed and car density an estimate of a traffic congestion is determined.

US 2013/0103296 A1 discloses a congestion estimation device located in a host vehicle calculating the probability of a congestion using different sensors. A speed detection unit detecting the speed of the host vehicle, an inter-vehicle distance detection unit configured to detect the inter-vehicle distance between the host and another vehicle. A correlation calculation unit configured to calculate a correlation based on the detected speed and the detected inter-vehicle distance.

Traffic congestion is a collective traffic problem and even though a single car can initiate a queue, the queue does not manifest itself immediately. A car approaching a car that is slowly moving or has stopped completely uses some time to slow down or stop. Another car further behind will behave similarly. Therefore, in a distance behind, for example, the car initiating a queue will only gradually be aware of a possible problem when the speed of cars in front slows down. If one detects a statistically significant slowing down of speed, this statistical estimate can be a signal of an upcoming traffic congestion. However, if the congestion detection is based on nearby cars in front of your position on the road it is probably too late to avoid being stuck in a traffic congestion. Therefore, there is a need of a system that can detect traffic congestion problems on larger portions of a road. If this is possible, cars entering the road from sideroads can be warned that there is possibly a traffic congestion problem even if the traffic on the road seems to flow well at this location on the road. After a while, the effect of stopping or slowing cars will be visible also at this location. But then it is too late for cars that have entered the road from the side road. The point is that if a warning is possible a driver can decide to turn around on the side road and identify another route towards his intended destination.

An aspect of the present invention is to use the fact that most modern cars are connected to the Internet and Global Position System (GPS) transceivers are either part of a car system or a GPS transceiver of a smart phone carried by a driver of a car.

A problem related to measurements of distance between one car and another car is that respective distance changes may occur randomly due to different incidents and situations inside a car. For example, a child in a car needs some attention from the father of the child driving the car. This may result in a slowing down of the speed and hence an increase in distance to the car in front which most probably continues with the speed the car is moving.

Therefore, an aspect of the present invention is to be able to identify a probable traffic congestion before the congestion actually has manifested itself. Therefore, the identification is based on an assessment if the distance between several cars begins to decrease in a consistent manner, which is a probable identification that a queue may start. On the other hand, if distances between several cars in a queue begin to increase consistently, it is a signal that a queue might be starting to dissolve.

A further aspect of the present invention is not just to measure distances between cars on road segments when such probable traffic congestion conditions are starting to develop. Investigating respective car distance developments ahead of a road segment experiencing accumulation of cars may identify the geographical point or limited area wherein a traffic congestion begins to develop. The opposite is also possible to detect a geographical position or a limited geographical area wherein a traffic congestion begins to dissolve.

When such geographical areas are detected a road surveillance system may communicate with respective cars in respective identified areas instructing drivers to choose different side roads or to increase their speed for example.

Therefore, there is a need of a traffic guidance and traffic information system providing improved traffic measurements as well as individual guidance to road users.

OBJECT OF THE INVENTION

It may be seen as an object of the present invention to provide a server system monitoring development of distances between respective cars based on GPS readings from the respective cars.

It is a further object of the present invention to provide an alternative to the prior art.

SUMMARY OF THE INVENTION

Thus, the above disclosed object and several other objects are intended to be obtained in a first aspect of the invention by providing at least one server system in communication with client systems either installed in computer systems of respective cars or installed in smart phones with GPS transceivers carried by drivers of respective cars, wherein the at least one server system is configured to detect possible traffic congestions by early detection of consistent changes in car distances.

Further objects are intended to be obtained by a system identifying congestions on roads by using a distributed system according to the present invention, wherein a traffic guidance system comprises at least one server configured to monitor traffic on a road system in a defined geographical area, wherein the server is configured to receive Global Position System (GPS) position data from respective cars together with a unique internet address of respective cars, the at least one server is configured to select a set of cars driving in a same direction on a road based on respective GPS positions of the cars, the at least one server initiates a measurement cycle comprising sampling GPS positions from the set of cars with a sampling frequency being a function of an average speed of the cars in the set of cars, wherein when a defined number of samples has been acquired a process of investigating a development of distance change between respective cars is performed by the at least one server, identifying if there is a consistent increase or decrease of distance between cars in the defined number of samples, if a consistent decrease in distance between cars is detected a probable traffic congestion is upcoming, if a consistent increase in distance between cars s detected a traffic congestion is probably dissolving.

Respective aspects of the present invention may each be combined with any of the other aspects. These and other aspects of the invention will be apparent from and elucidated with reference to the embodiments described hereinafter.

BRIEF DESCRIPTION OF THE FIGURES

The method and system thereof according to the present invention will now be described in more detail with reference to the accompanying figures. The accompanying figures illustrates an example of embodiment of the present invention and is not to be construed as being limiting to other possible embodiments falling within the scope of the attached claim set.

DETAILED DESCRIPTION OF THE INVENTION

Figure 1:
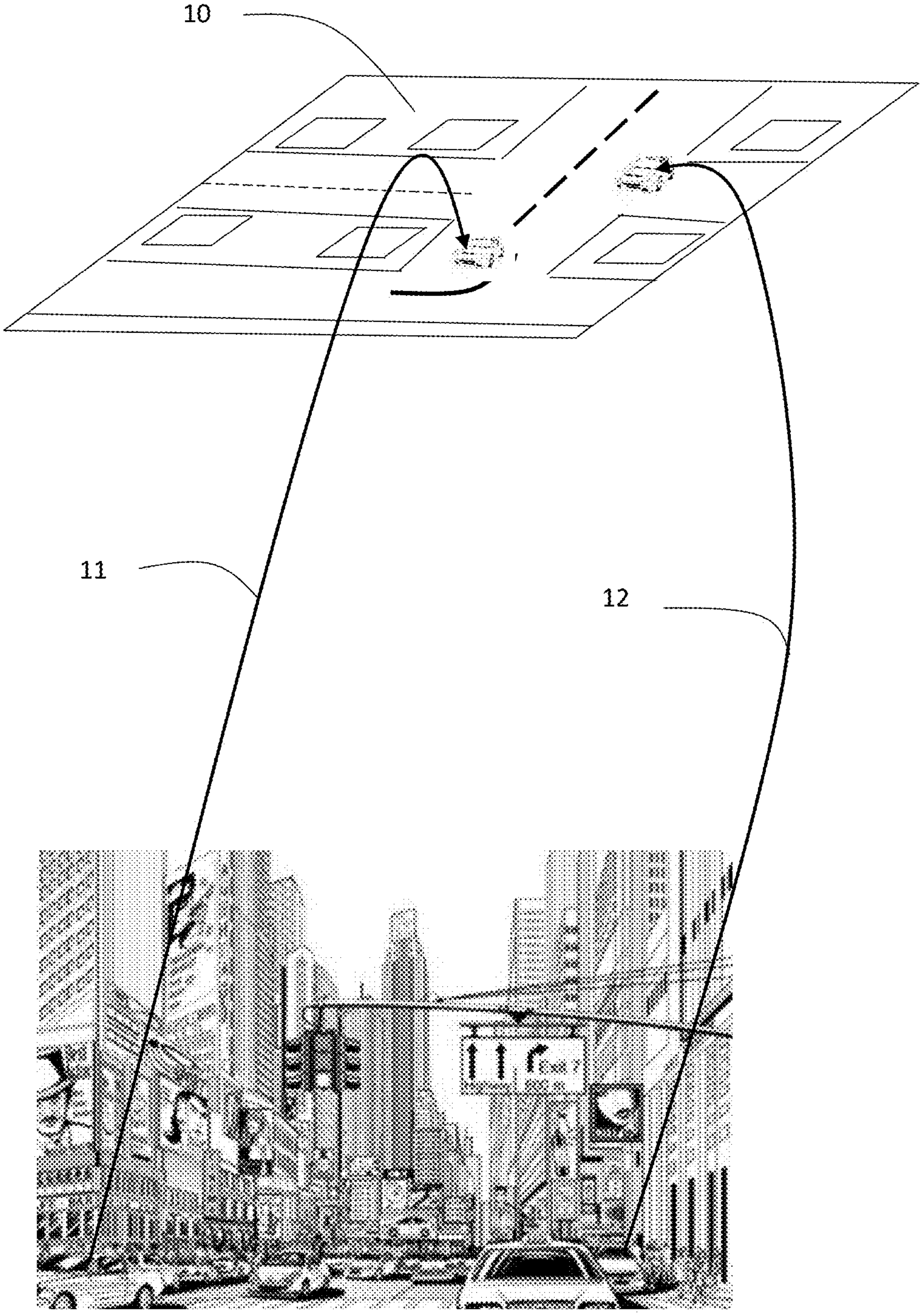
FIG. 1 illustrates an example of embodiment of the present invention.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. The mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

When GPS positions of cars are plotted in Google™ maps for example, this is usually done over the Internet in a communication protocol denoted connectionless communication, The GPS data sent from cars is datagrams according to the Internet standard, which implies that the data packages do not contain a sender address, but only the address of the destination. If a datagram is lost, it is not a problem. It will just appear as a missing dot on a continuous line in the map.

Therefore, there is no means of directly identifying an individual car, or road user, when viewing a displayed symbol on a map visualizing the movement of the car the road user is driving, for example by pushing a symbol on the display screen representing a moving car.

According to an example of embodiment of the present invention, a road user will register himself as a user of the system in a server reserved for the residential area of the road user.

For example, a road user living in Oslo in Norway will access a server with an Internet address comprising address elements of Norway-Oslo. District. The server, denoted home server (HS) may be a virtual or physical server being part of a larger physical server system. The generic form of the address of the HS will be:

country-code, city-code.district-code.

Further, if the Internet address country-code.city-code.district-code is amended with a unique user identification provided for registered road users of the HS the following address of the users is established.

country-code.city-code.district-code.user-ID.

Therefore, since the user identity is unique the whole address is unique for each registered road user, also across all districts. Such an address is easily translated to an Internet address pointing to for example a WEB page, and/or a user profile etc. hosted by the HS, which can be regarded as a home page for the road user. It is also possible to have sub-pages allocated to the address.

Further, the unique address makes It possible to establish process to process communication between the HS and other processes in other computers sharing user data etc. being pre-stored at the time of registering a user, or which are interactively being updated by other computer processes or other users of the system.

When a road user is registering as a user, a traffic client system (TC) selected by the road user is initialized with the web address of his profile hosted by the US and a system allocated address of his selected TC.

When a road user is driving around in his car his geographical position Is changing all the time. Therefore, within a further aspect of the present invention, the address of a road user may be amended with the current GPS position as well, i.e.

country-code.city'Code.distrlct-code.user'ID.current-GPS.

A road user coming online, for example when starting the car in the morning, triggers the TC associated with the road user to contact the IS where the road user is registered (or the user triggers the action). The HS reads out the current GPS position from the TC and identifies the approximate geographical position of the road user. If the road user is temporarily located in another country for example, the home server MS contacts for example a top node server of the county. The top node server may then use the GPS position submitted from the home server MS to identify the city (or region) in the country the user is located, and the city (or region server) identifies a district server allocated to the district the user is located. If the city or region is has a small population, the city and district server may be the same server. Based on the transferred GPS position the city server (district server) identifies which one of the traffic base station (TBS) in the district that can serve the road user. The TBS receives the address of the TC associated with the road user. The TBS can be configured to maintain a computer coded map of the limited geographical area the TBS is configured to serve. Then the TBS can read out the current GPS position and update the position in the map. The TBS can further be configured to maintain a table of GPS positions of each TC (for example using the TC address as the table identifier) being inside the geographical area of the TC at all times.

When a temporary address of the road user is identified according to the scheme disclosed above, the temporary address comprising the current country code, city code, district code, traffic base station address etc., is updated in the user profile of the road user residing in the HS. Therefore, when another road user or computer process is contacting the road user via the unique address of the road user being associated with the HS server, the HS automatically follows the temporary associated address pointing to the dynamic GPS position the road user is located all the time. For example, a copy of the computer coded map of the service area of the TBS serving the road user can be transferred or viewed by the contacting road user.

A reverse addressing is also possible. For example, a symbol representing a specific road user position in a map may be selected, either by pushing a finger on a display, or a search algorithm initiated by a process identifies the symbol and associated GPS position.

When a road authority needs contacting specific road users in a geographical area, for example due to possible terrorist activity, large fires, hazards of explosives being stored in the area etc., or is a road user driving in front of a queue the searching can be initiated by the authority. Based on the location of the incident requiring the attention, the searching algorithm may send an identified GPS position of respective road users of interest through an identification process according to the present invention. If the authority has a computer coded map at disposal, the map may be updated with the geographical positions of the TBS(s) located in the area, for example from the city server, or district server. In an embodiment of the present invention, a warning message to the road users of interest can be sent from the authority just by pasting a message on top of the respective symbols representing the at least one traffic base TBS being in the area having a coverage area the road users are within, Then the TBS can submit the message to the road users via the recorded TC address being dynamically maintained by the TBS.

The tables associated with the TC addresses are maintained with the respective GPS positions. When one tries to contact a single road user, or needs to identify the road user driving the car, pushing the symbol on map may identify the GPS position as known to a person skilled in the art. Then the GPS position may be submitted to an identification process that may start at the top node of the country.

Based on the current GPS position the TBS serving the road user is identified, and by searching recorded GPS positions in the TBS, the TC address associated with the GPS position is identified, and hence the TC address is identified etc.

Alternatively, the map used when pushing the symbol representing the road user may comprise an information layer with the positions of respective TBS servers. Then a simple algorithm running in the computer hosting the computer coded map can identify which TBS is serving the road user based on comparing the size of the service area with the current GPS position and decide which service area the GPS position is within. Then an address of the specific TBS can be for example be part of the information layer and the TBS serving the road user can be contacted directly and the message for example can be sent.

FIG. 1 illustrates an example of a map over an area 10 being the service area of a specific traffic bae station TBS, Respective cars 11, 12 updates the map with their respective GPS positions. The map is illustrated as being in the cloud above the road system of the city. In an example of embodiment of the present invention, a common map of the service area is updated with all the GPS positions and the map residing in the Cloud is accessible to all the road users driving inside the service area. If a road user is in need of cooperating with other road users in the area, the road user can select the respective road users by pushing the symbols representing their positions on a map being displayed locally in his car. The TC can ask the TBS to establish a communication channel between them, for example, a voice channel, and the cooperating road users can share knowledge about the current traffic situation. The identification of the TC addresses is based on searching with the GPS as discussed above.

Figure 2:
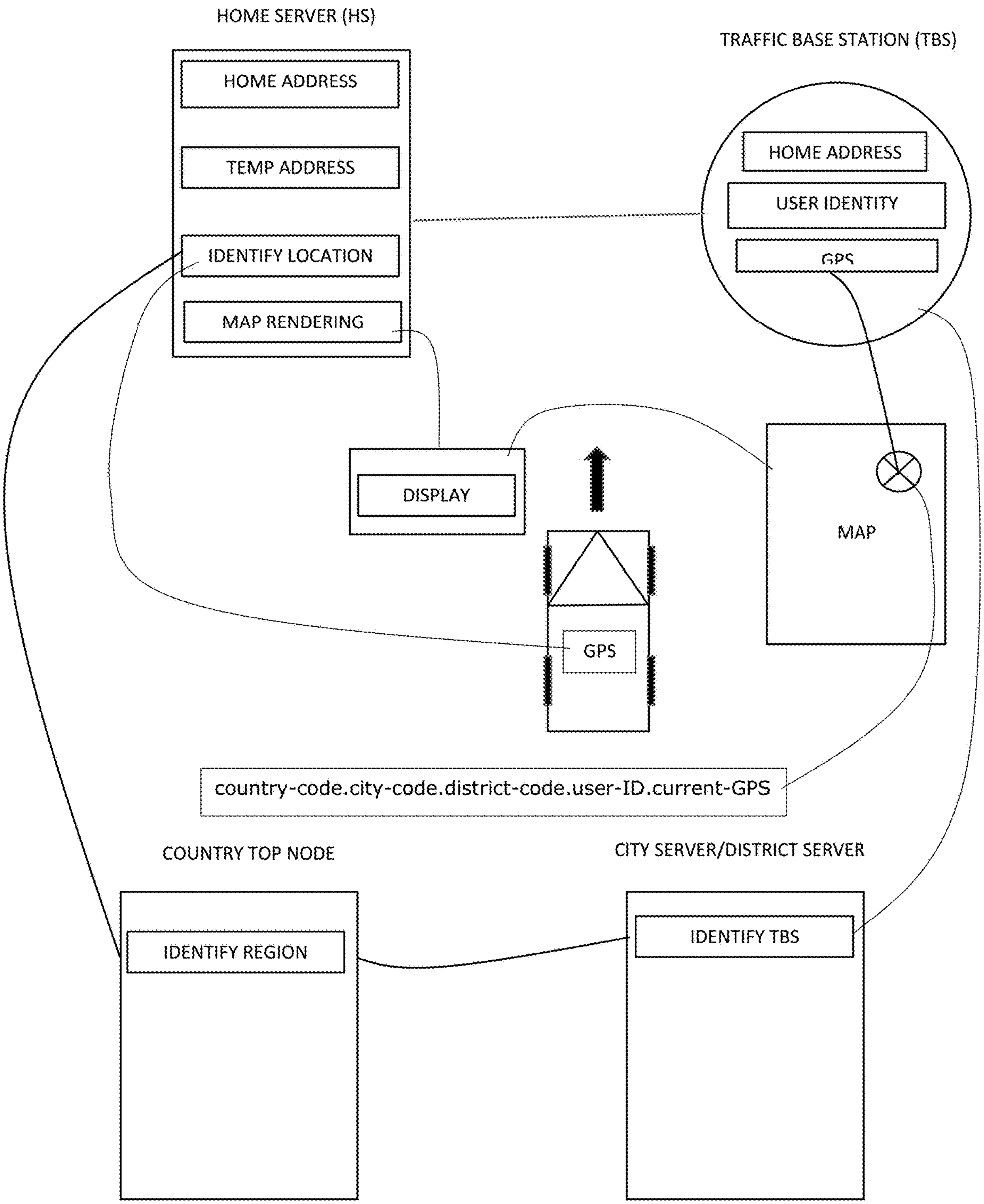
FIG. 2 illustrates an example of embodiment of the present invention.

FIG. 2 depicts respective server allocations and the basic paths between them when performing forward addressing as well as reverse addressing as discussed above.

When road users are driving around they will eventually drive out of the service area of a first TBS and into the service area of a second TBS. Each TC of the respective road users will initially be brought into contact with a correct TBS when coming online as discussed above. The TC may also be configured to contact the HS at any time and ask the HS to establish or re-establish a contact with a TBS in the neighbourhood of the geographical position the TC is located according to a process identical with the process discussed above when turning on power in the morning.

Figure 3:
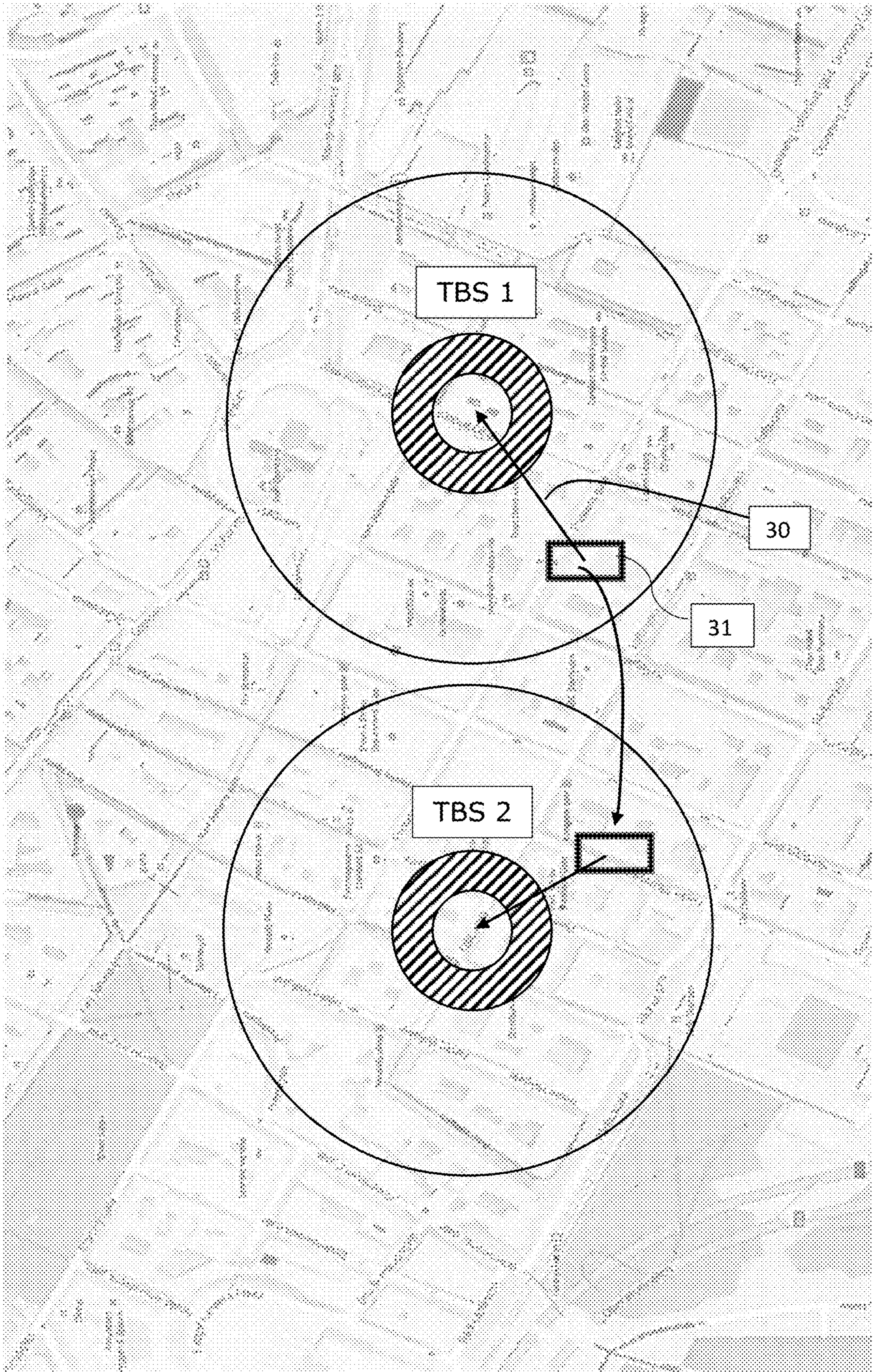
FIG. 3 illustrates an example of embodiment of the present invention.

When an association between a specific TC and a specific TBS is established the TBS can submit to the TC the radius of the service area the TBS is serving. Then the client TC can itself monitor if the TC is located inside the radius of the serving area or not. When the TC discovers that it is not inside the service area of the previous TBS, the TC contacts the HS and receives an allocation to a next TBS serving the TC according to the shifted GPS position. It is possible to implement a soft handover between a first TBS and a second TBS in that the first TBS only signals the hand over when any process the TBS is part of with the specific TC (or road user), for example a voice communication with another road user, is terminated. It is important to understand that the service area concept is a virtual concept only used to achieve segmentation of users and association of respective users with respective segmented servers, i.e. a truly distributed system. FIG. 3 illustrates an example of handover from a TBS 1 to a TBS 2 of a car 30 driving from the service area of the TBS 1 into the service area of TBS 2.

The distributed architecture allows also any user of process somewhere in the world to contact and identify any type of moving object anywhere in the world. If the map of "the world" is scrolled to display a geographical area of interest, the GPS position of a selected point on the map section of interest can be used to identify and establish contact with the TBS serving the area comprising the selected GPS position. Then the common map of the service area residing in the Cloud can be displayed together with the moving positions of ail moving objects around inside the service area.

By following the examples of procedures discussed above, the identity and communication with the selected object is possible. The same effect is also possible when a select group of moving objects are selected, either by human interactions, or by a computer implemented process searching for the select group according to a specific search argument.

A further interesting aspect of the solution of using traffic base stations TBS is the ability to perform time correlated measurements of traffic on roads within the respective service areas of the TBS.

For example, when measuring distances between cars it is important to understand that there is noise present in GPS data that are collected. Even though the distance between cars is normally between two meters in city traffic, at any time the distance may decrease, for example because a car in front of another car slows down because the driver is trying to fetch a chocolate bar residing in a compartment in the car.

Another situation may be that the car in front is speeding up because the driver realize that he is late to a meeting and tries to catch up the time by speeding up.

Therefore, when recording GPS positions randomly between cars, the distance difference calculated may comprise noise generated by this random behaviour. Further, many drivers do not maintain a constant speed when driving, it is normal to have some random movements of the feet controlling the accelerator pedal When the distance between cars is larger, the space around cars permits much larger fluctuations of distance variations between cars, if the speed is high, the observation is that cars tend to be concentrated over a distance in spaced apart groups. If random measurements of distances between cars is performed in any of these cases, a calculated signal would indicate a large fluctuation in distance measurements in the first case, and in the second case, the larger distances in between the groups of cars would be present in the calculated signal. If the signal is used to identify a possible queue problem as discussed above, the signal interpretation would correctly indicate that there is no probable queue problem, In a situation wherein the distances changes between respective cars are moderate that distance fluctuations may mask a signal indicating an upcoming queue problem.

Therefore, it is necessary to mitigate the randomness of GPS measurements to be able to identify a consistent decrease of distances between cars as early as possible.

One approach is to make time correlated GPS readings, i.e., a selected group of cars submit their GPS position on the same point in time. Then the randomness of movement is disturbing less the calculated distances. Then it is possible to establish a signal that might indicate the start of a congestion problem very early.

The TBS may issue a synchronization signal to road users driving on roads inside the service area of the TBS, and the TBS may collect the time GPS readings from the TC for example. Synchronization of measurements over the Internet is disclosed in for example the standard IEEE 802.1.

According to an aspect of the present invention, a selected group of cars on a road inside the service area of a TBS can receive a synchronization signal and then read out their respective GPS positions in parallel. The cars can store the respective GPS positions locally in the cars, and an external system may address the selected cars and can read out the time correlated GPS positions. The external system may combine measurements from a plurality of interconnected roads being served by different TBS servers. Then the system can identify a consistent increase or decrease of distances between the selected cars over large geographical areas.

The interpretation of the distance signal comprises investigating car distance development ahead of a road segment experiencing accumulation of cars. Based on such analysis the geographical point or limited area wherein the accumulation of cars starts can be identified by the fact that by definition the starting area will be adjacent to a road segment wherein car distances start to increase again or are just normal (has been normal all the time). The geographical point or limited area joining a road segment with accumulation of cars with a road segment with normal condition (or improving condition) is dynamically changing. If the joining area or point moves forward in the driving direction, the queue problem is increasing in this direction. If the joining area or point moves backwards the queue problem might be over, or the initial measurement of decreasing car distances was not an indication of a real queue problem.

According to an example or embodiment or the present system, a logical address may be amended with a dynamically updated GPS position identified by a GPS transceiver associated with a TC unit being carried with a road user when the road user Is traveling around, thereby a logical address of the road user is transformed into a live physical address comprising the address fields:

country-code.city-code.district-code.user>ID.current-GPS.

Further, a physical addresses of the TC is maintained by the TC locally, and wherein external computer systems or other units of the distributed computer system, including process to process communications, reads out the physical address of a TC by using a logical address of the TC.

In another example of embodiment of the distributed system according to the present invention the logical address of a TC is the internet address of a home page associated with the road user and is hosted by the HS. The home page may also function as the user profile of the road user as discussed above. The home page is updated with live information about the geographical position a road user is positioned on at any time. This may be achieved simply by configuring the TC to write or update the current GPS position of the TC from time to time, or an a regular basis on the home page associated with the road user. Then the logical address is the address of the home page associated with the road user, and the physical address is the combination of the home page address and the live GPS position on the home page. Each respective TBS maintains a list of road users inside the respective service areas as discussed above. In this example of embodiment, the TBS receives maintains respective Internet addresses of each respective road user being Inside the service area of the TBS. When an external service provider like a traffic control centre needs to contact specific road users in an area, the TBS or stations in the area are contacted and a list of home address links (Internet addresses) of the road users is transferred to the service provider. Then the service provider can read out the GPS from each respective home page. The service provider can then create an association between respective GPS positions and the Internet address of each road user. Then messages and communication between the service provider and the respective road users can be established. The service provider can also maintain a map with GPS positions being updated by reading out the GPS position at any time. Then the map will be able to track the road users within the service are of a specific TBS.

According to an example of embodiment of the present invention, a server system comprises at least one server configured to monitor traffic on a road system in a defined geographical area, wherein the server is configured to receive Global Position System (GPS) position data from respective cars together with a unique internet address of respective cars, the at least one server is configured to select a set of cars driving in a same direction on a road based on respective GPS positions of the cars, the at least one server initiate a measurement cycle comprising sampling GPS positions from the set of cars with a sampling frequency being a function of an average speed of the cars in the set of cars, wherein when a defined number of samples has been acquired a process of investigating a development of distance change between respective cars is performed by the at least one server, identifying if there is a consistent increase or decrease of distance between cars in the defined number of samples, if a consistent decrease in distance between cars is detected a probable traffic congestion is upcoming, if a consistent increase in distance I between cars s detected a traffic congestion is probably dissolving.

The example of embodiment disclosed above may comprise sampling repeatedly a same set of cars over a defined length of time.

The example of embodiment disclosed above may use a sampling frequency used for cars on a specific road as a function of the allowed speed limit for the specific road, wherein a lower allowed speed limit requires a lower sampling rate while a higher speed limit requires a higher sampling rate.

The sampling rate for a specific road can also be pre-stored in the at least one server, wherein the pre-stored sampling frequency is identified through for example a pre-performed test of a specific road when the traffic is normal on the specific road.

The example of embodiment disclosed above comprises an investigation of the acquired samples comprising the average distance change acquired from the set of cars in a first set of sampled GPS data to a next sampled set of GPS data.

The example of embodiment disclosed above may also comprise that when the defined number of samples has been acquired a new set of cars on the same road is selected to be part in a new sampling of GPS data from cars on the road.

The example of embodiment disclosed above may also comprise that a road being investigated is divided into a set of road segments wherein the at least one server is configured to sample GPS positions in parallel from the respective road segments.

The example of embodiment disclosed above may also comprise that the at least one server is part of a client-server system comprising a plurality of distributed home servers (HS) hosting home pages of registered road users associated with respective areas served by each respective HS, and a plurality of distributed traffic base stations (TBS), wherein the at least one server is one of the plurality of traffic base stations, serving respective road users being at any time within a defined geographical service area around each respective traffic base station (TBS), the HS is configured to assign a unique user identification (user-ID) to each registered road user of the client-server system, wherein the unique user identification is part of the home page address, a traffic client system (TC) system is installed in a computer system in cars or in a smart phone carried by road users driving respective cars providing communication between a specific road user and the home server the road user is registered, the traffic client system (TC) of each registered road user is updating current GPS positions on the respective home pages of the road users, wherein the HS is configured to record received GPS positions in an ordered sequence, when sampling GPS positions the client system (TC) of each respective selected car in the set of cars are instructed by the traffic base station (TBS) they are served by to update the GPS position on the HS, wherein the sequence of updating the GPS positions continues according to the selected sampling frequency.

Further, a service provider may communicate with a respective road user via the home page address of respective road users.

Further, the service provider may be the at least one server (TBS) informing respective road users about possible congestions.

Further, the service provider may be a central traffic authority informing the road users about possible alternative routes around traffic congestions.

Further, the service provider may identify the identity and/or a communication the address of a road user based on plotted GPS positions on a map, by identifying the at least one server, or TBS, the GPS position is sampled from and then instruct the at least one server to upload all current GPS positions together with the respective user-identities submitted from respective cars.

Further, the at least one server may be identified by the service provider by acquiring a topology map identifying the respective positions of all TBSs from a server supervising the client-server system.

Further, the at least two servers serving different road systems in different geographical areas are configured to combine sampled GPS positions.

Further, a central supervisor server may receive sampled GPS positions from a plurality of servers covering different geographical areas thereby enabling detection of probable congestions in road systems of larger geographical areas.

What is claimed is:

1. A traffic guidance system comprising at least one server configured to monitor traffic on a road system in a defined geographical area, wherein the server is configured to receive Global Position System (GPS) data from respective cars together with a unique internet address of respective cars, the at least one server is configured to select a set of cars driving in a same direction on a road based on respective GPS positions of the cars, the at least one server initiates a measurement cycle comprising sampling GPS positions from the set of cars with a sampling frequency being a function of an average speed of the cars in the set of cars, wherein when a defined number of samples has been acquired a process of investigating a development of distance change between respective cars is performed by the at least one server, identifying if there is a consistent increase or decrease of distance between cars in the defined number of samples, if a consistent decrease in distance between cars is detected a probable traffic congestion is upcoming, if a consistent increase in distance between cars is detected a traffic congestion is probably dissolving;

wherein the GPS data together with the unique internet address has the format: 'country-code.city-code.district-code.user-ID.current-GPS'.

2. The system of claim 1, wherein sampling of GPS positions are repeatedly done for a same set of cars over a defined length of time.

3. The system of claim 1, wherein the sampling frequency used for cars on a specific road is a function of an allowed speed limit for the specific road, wherein a lower allowed speed limit requires a lower sampling rate while a higher speed limit requires a higher sampling rate.

4. The system of claim 3, wherein a sampling rate for a specific road is pre-stored in the at least one server, wherein the pre-stored sampling frequency is identified through a pre-performed test of a specific road when the traffic is normal on the specific road.

5. The system of claim 1, wherein investigation of the samples comprises investigating the average distance change acquired from the set of cars in a first set of sampled GPS data to a next sampled set of GPS data.

6. The system of claim 1, wherein when the defined number of samples has been acquired a new set of cars on the same road is selected to be part in a new sampling of GPS data from cars on the road.

7. The system of claim 1, wherein the road is divided into a set of road segments wherein the at least one server is configured to sample GPS positions in parallel from the respective road segments.

8. The system of claim 1, wherein the at least one server is part of a client-server system comprising a plurality of distributed home servers (HS) hosting home pages of registered road users associated with respective areas served by each respective HS, and a plurality of distributed traffic base stations (TBS), wherein the at least one server is one of the plurality of traffic base stations, serving respective road users being at any time within a defined geographical service area around each respective TBS;

the HS is configured to assign a unique user identification (user-ID) to each registered road user of the client-server system, wherein the unique user identification is part of a home page address;

a traffic client system (TC) system is installed in a computer system in cars or in a smart phone carried by road users driving respective cars providing communication between a specific road user and the home server the road user is registered;

the TC of each registered road user is updating current GPS positions on the respective home pages of the road users, wherein the HS is configured to record received GPS positions in an ordered sequence; and when sampling GPS positions the TC of each respective selected car in the set of cars are instructed by the TBS they are served by to update the GPS position on the HS, wherein the sequence of updating the GPS positions continues according to the selected sampling frequency.

9. The system of claim 8, wherein a service provider can communicate with a respective road user via the home page address of respective road users.

10. The system of claim 9, wherein the service provider is the at least one server TBS informing respective road users about possible congestions.

11. The system of claim 9, wherein the service provider is a central traffic authority informing the road users about possible alternative routes around traffic congestions.

12. The system of claim 9, wherein the service provider can identify the identity and/or a communication address of a road user based on plotted GPS positions on a map, by identifying the at least one server, or TBS, the GPS position is sampled from and then instruct the at least one server to upload all current GPS positions together with the respective user-identities submitted from respective cars.

13. The system of claim 12, wherein the at least one server is identified by the service provider by acquiring a topology map identifying the respective positions of all TBSs from a server supervising the client-server system.

14. The system of claim 1, wherein at least two servers serving different road systems in different geographical areas are configured to combine sampled GPS positions.

15. The system of claim 14, wherein a central supervisor server receives sampled GPS positions from plurality of servers covering different geographical areas thereby enabling probably detection of probable congestions in road systems of larger geographical areas.

16. The system of claim 1, wherein the system identifies a probable traffic congestion situation of an upcoming traffic congestion or a dissolving traffic congestion before the traffic congestion situation actually has manifested itself.

* * * * *